Nov. 14, 1939.     S. R. PUFFER     2,180,168
GAS TURBINE DRIVEN GENERATOR ARRANGEMENT
Filed June 7, 1938
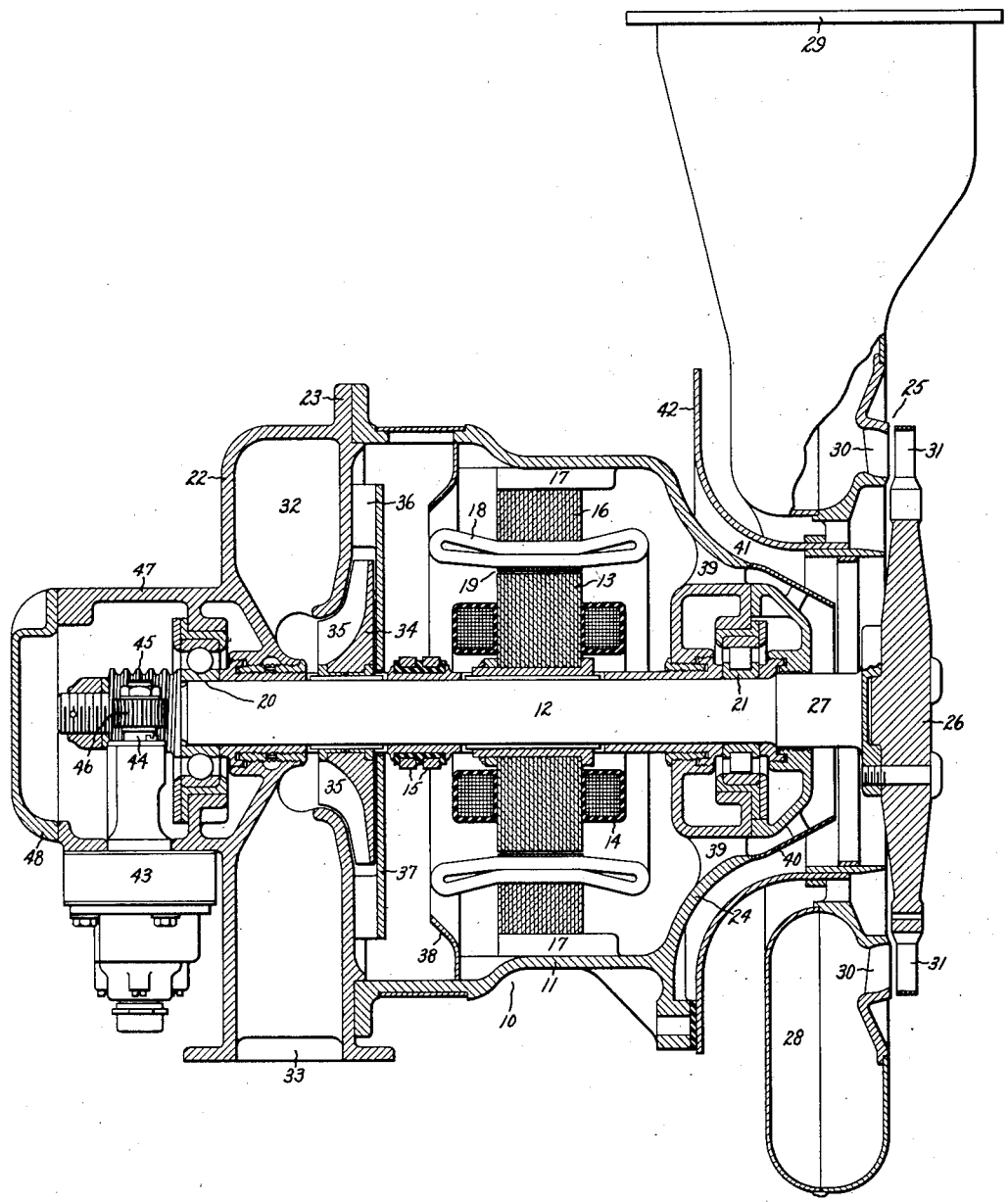
Inventor:
Samuel R. Puffer,
by Harry E. Dunham
His Attorney.

Patented Nov. 14, 1939

2,180,168

UNITED STATES PATENT OFFICE 2,180,168

GAS TURBINE DRIVEN GENERATOR ARRANGEMENT

Samuel R. Puffer, Saugus, Mass., assignor to General Electric Company, a corporation of New York Application June 7, 1938, Serial No. 212,297

7 Claims. (Cl. 290—52)

The present invention relates to gas turbine driven generator arrangements of the type in which a gas turbine is supplied with high temperature combustion gases from an internal combustion engine or other source and has a bucket wheel secured to the generator shaft. Arrangements of this kind when used as auxiliary power plants for aircraft necessitate a compact design due to the relatively small space available and the provision of special cooling means for the generator.

The object of my invention is to provide an improved construction and arrangement of gas turbine driven generators which occupy little space, permit effective cooling of the generator and may be operated with safety and high efficiency.

For a consideration of what I believe to be novel and my invention, attention is directed to the following description and the claims appended thereto in connection with the accompanying drawing.

The single figure of the drawing illustrates a sectional view of a gas turbine driven generator arrangement in accordance with my invention.

The arrangement comprises an electric generator 10 with an outer casing 11 and a shaft 12. The rotor of the generator includes a magnetic path formed by laminated iron 13 fastened to the shaft and a winding 14 secured to the lamination and slip rings 15 insulated from the shaft for conducting exciting current to the winding 14. The stator of the generator has a magnetic path formed by slotted laminated iron 16 supported on the casing and forming a support of ducts 17 between the outer surface of the lamination and the casing 11. Windings 18 are embedded in the slots of the stator laminations near an airgap 19 between the rotor and the stator. The rotor with the shaft 12 is supported by bearings 20 and 21 respectively, the bearing 20 being held on a detachable end shield 22 of the generator. This end shield has flanges 23 secured to corresponding flanges of the casing 11. The bearing 21 is supported on the right-hand end shield 24 of the generator, which shield in the present instance is formed by an extension of the casing 11. The generator is driven by a gas turbine 25 which includes a single bucket wheel 26 secured to a right-hand, overhung portion 27 of the shaft 12. Gas, such as exhaust gas from an internal combustion engine, is conducted to the bucket wheel 26 by means of a nozzle box 28 disposed intermediate the bucket wheel 26 and the generator casing 11 and having a flanged inlet conduit 29. The nozzle box 28 forms a plurality of nozzles 30 for properly discharging gas into passages formed by buckets 31 of the bucket wheel. The compact arrangement, that is, the close spacing of the gas turbine and the generator, requires the provision of special cooling means for the generator to protect the latter against high temperature due to radiation and convection from the high temperature gas turbine. To this end the generator is provided with a built-in centrifugal type compressor for forcing air through the gaps and ducts formed by the generator, towards the bucket wheel and along a special channel formed between the generator casing and the gas turbine nozzle box. More specifically, in the present arrangement the detachable end shield 22 of the generator forms an annular inlet channel 32 with a flanged inlet opening 33 of a centrifugal compressor. The latter also includes an impeller 34 with a row of blades 35 for compressing air received from the inlet channel 32. The air discharged from the impeller 34 is conducted through a diffuser 36 whereby velocity energy of the air discharged from the impeller 34 is converted into pressure energy. The diffuser 36 has a side wall 37 which forms an end wall of the compressor. The compressed air discharged by the diffuser 36 is forced through the ducts 17 formed in the circumferential part of the generator stator and also through the gap formed between the stator and rotor, as well as through other ducts and spaces formed by the windings and other parts of the generator effectively to cool the latter. In order to reduce the amount of air forced through the large ducts 17 and assure the flow of sufficient cooling air through the other gaps and spaces in the generator, a flared ring 38 is provided ahead of the inlets of the ducts 17 as regards the direction of flow. The air leaving the generator proper is conducted through channels 39 formed between the right-hand end portion of the casing 11 and the casing of the bearing 21. The channels 39 are extended by a shield 40 secured at its left-hand end to the extension 24 of the casing 11 and opening at its right-hand end towards the bucket wheel. With the provision of the shield 40 the casing of the bearing 21 is continuously cooled during operation by a stream of cooling air. The air discharged from the opening of the end shield 40 is forced towards the central portion of the bucket wheel 26, whence it flows through an annular channel 41 formed between the extensions 24, 40 of the generator casing 11 and a protecting shield 42 arranged intermediate the turbine casing and the gas turbine nozzle box. This end shield 42 confines the cooling air discharged from the generator in the comparatively narrow channel 41 and thereby assures effective cooling of the outer surface of the generator casing and at the same time it reduces heating of the generator casing due to radiation and convection of heat from the gas turbine nozzle box.

A machine 43 which may be an oil pump or an exciter for the generator is connected to an overhung portion of the left-hand end of the generator shaft 12. For the purposes of compactness of the construction and stability of operation, the machine 43 has a shaft 44 arranged at right angles with the generator shaft 12 and driven therefrom by a worm gear including a worm 45 fastened to the left-hand, overhung portion of the shaft 12 and a gear 46 secured to the shaft 44 and meshing with the worm 45. The gearing 45, 46 is enclosed in a casing which includes an extension 47 of the end shield 22 and an end plate 48 flanged to the extension 47.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Gas turbine driven generator arrangement including the combination of an electric generator having a rotor shaft, a casing, bearings supporting the shaft on the casing, a gas turbine including a bucket wheel secured to the shaft, and means for cooling the generator and bucket wheel comprising a centrifugal type compressor built into the generator to force air through the latter and discharge it towards the bucket wheel.

2. Gas turbine driven generator arrangement including an electric generator having a shaft and a casing, a bearing for the shaft supported inside an end portion of the casing, a gas turbine having a bucket wheel secured to the shaft adjacent the bearing and a nozzle box surrounding the shaft intermediate the bucket wheel and the casing, the generator having a detachable end shield opposite the bucket wheel, and means for cooling the generator comprising a centrifugal type compressor built into the generator and having an inlet channel defined by the end shield.

3. Gas turbine driven generator arrangement including an electric generator having a shaft, a casing forming a plurality of ducts and gaps for cooling air, a bearing for the shaft surrounded by and supported on an end portion of the casing, a gas turbine including a bucket wheel secured to the shaft adjacent the bearing and a nozzle box between the bucket wheel and the casing, a shield between the casing and the nozzle box to protect the casing against heat from the nozzle box and to form a channel with the casing, and means including a centrifugal type supercharger with a diffuser built into the generator to force cooling air through said ducts, gaps and channels.

4. Gas turbine driven generator arrangement including a generator having a casing and a shaft supported on the casing and forming overhung portions, a gas turbine for driving the generator having a bucket wheel secured to one of the overhung portions, and an exciter for the generator having a shaft driven from the other overhung portion of the generator shaft and being mounted at a right angle thereto.

5. Gas turbine driven generator arrangement including a generator having a casing and a shaft supported on the casing and forming overhung portions, a gas turbine for driving the generator having a bucket wheel secured to one of the overhung portions, a machine associated with the generator having a shaft driven from the other overhung portion of the generator shaft and being mounted at a right angle thereto, and means including a centrifugal type compressor with a diffuser built into the casing to cool the generator and the bucket wheel.

6. Gas turbine driven generator arrangement including the combination of an electric generator having a shaft, a gas turbine having a bucket wheel, and means for cooling the generator and the bucket wheel comprising a pump for forcing air through the generator, the generator having a casing with an opening adjacent the bucket wheel to discharge cooling air from the generator through the opening towards the bucket wheel.

7. Gas turbine driven generator arrangement including the combination of an electric generator having a casing with an open end portion and a shaft, a gas turbine with a bucket wheel secured to an overhung portion of the shaft near the open end portion, and means disposed at least partly within the other end portion of the generator casing for forcing cooling air through the generator and discharge it through the opening in the first mentioned casing end portion towards the bucket wheel.

SAMUEL R. PUFFER.